(12) United States Patent
Yokoyama (10) Patent No.: US 9,046,151 B2
(45) Date of Patent: Jun. 2, 2015

(54) CHAIN

(71) Applicant: Tsubakimoto Chain Co., Osaka-shi, Osaka (JP)

(72) Inventor: Masanori Yokoyama, Osaka (JP)

(73) Assignee: TSUBAKIMOTO CHAIN CO., Osaka-shi (JP)

( * ) Notice: Subject to any disclaimer, the term of this patent is extended or adjusted under 35 U.S.C. 154(b) by 69 days.

(21) Appl. No.: 13/947,213

(22) Filed: Jul. 22, 2013

(65) Prior Publication Data

US 2014/0057750 A1 Feb. 27, 2014

(30) Foreign Application Priority Data

Aug. 22, 2012 (JP) ................. 2012-183460

(51) Int. Cl.
*F16G 13/02* (2006.01)
*F16G 13/06* (2006.01)

(52) U.S. Cl.
CPC .................... *F16G 13/06* (2013.01)

(58) Field of Classification Search
CPC ........... F16G 13/06; F16G 13/04; F16G 5/18; F16G 13/02; F16G 13/18
See application file for complete search history.

(56) References Cited

U.S. PATENT DOCUMENTS

| | | | | |
|---|---|---|---|---|
| 108,473 A | * | 10/1870 | Good | 474/206 |
| 240,819 A | * | 5/1881 | Ewart | 474/227 |
| 255,950 A | * | 4/1882 | Dodge | 474/206 |
| 282,689 A | * | 8/1883 | Weller | 474/206 |
| 339,003 A | * | 3/1886 | Miller | 474/206 |
| 415,300 A | * | 11/1889 | Shellaberger | 474/206 |
| 455,226 A | * | 6/1891 | Merrill | 474/206 |
| 465,142 A | * | 12/1891 | McCray | 474/206 |
| 599,970 A | * | 3/1898 | Menk | 474/49 |
| 697,165 A | * | 4/1902 | Palmros | 474/228 |
| 870,704 A | * | 11/1907 | Weston | 474/227 |
| 2,024,183 A | * | 12/1935 | Pribil | 59/8 |
| 2,741,107 A | * | 4/1956 | Garner et al. | 66/242 |
| 3,439,494 A | * | 4/1969 | Gettmann et al. | 59/78 |
| 3,608,499 A | * | 9/1971 | Krammer | 104/172.5 |
| 3,844,221 A | * | 10/1974 | Fromme | 104/172.5 |
| 4,570,436 A | * | 2/1986 | Wilkie | 59/7 |
| 4,636,181 A | * | 1/1987 | Savolainen et al. | 474/207 |
| 4,750,325 A | * | 6/1988 | Messier | 59/78 |
| RE32,941 E | * | 6/1989 | Newton | 474/210 |
| 5,226,855 A | * | 7/1993 | Van Lierde | 474/206 |
| 5,520,585 A | * | 5/1996 | Green et al. | 474/206 |
| 5,966,923 A | * | 10/1999 | Nakamura | 59/78 |
| 6,364,799 B1 | * | 4/2002 | Campagnolo | 474/206 |
| 7,726,469 B2 | * | 6/2010 | Frost et al. | 198/851 |
| 2008/0026896 A1 | * | 1/2008 | Curran | 474/206 |

FOREIGN PATENT DOCUMENTS

JP 2-10848 U 1/1990

* cited by examiner

*Primary Examiner* — Henry Liu
(74) *Attorney, Agent, or Firm* — Westerman, Hattori, Daniels & Adrian, LLP (57) ABSTRACT

Inner links of a chain are formed as an integral link unit, each having a pair of connecting pin portions and a pair of plate portions coupling the pair of connecting pin portions, so as to have higher strength and improved durability, whereby the cost of the chain is reduced because of the ease of assembly and a reduction in the number of components. The chain is formed by coupling together link units and pairs of link plates alternately and pivotally in a longitudinal direction of the chain. The link unit is formed by inseparably joining a pair of connecting pin portions and a pair of plate portions at joint parts.

6 Claims, 8 Drawing Sheets

Prior Art

Fig. 8

Prior Art

CHAIN

BACKGROUND OF THE INVENTION

1. Field of the Invention

The present invention relates to a chain formed by a plurality of inner links and outer links coupled together alternately and pivotally in the longitudinal direction of the chain and placed over a sprocket.

The chain is used as a transmission chain, for example.

2. Description of the Related Art

Conventional chains that are placed over a sprocket are formed by a plurality of inner links and outer links. The inner link, for example, has a pair of inner link plates and a pair of bushings press-fitted in the link plates. The outer link has a pair of outer link plates and a pair of connecting pins press-fitted in the link plates. The connecting pins of each outer link are loosely fitted in the bushings of each inner link so that the inner links and the outer links are alternately and pivotally coupled together in the longitudinal direction of the chain.

One known chain uses inner links that are formed as a single piece component to include a pair of inner link plates and a pair of bushings by a single piece forming process (see, for example, second to fourth columns and drawings of Japanese Examined Utility Model Application Publication No. H2-10848).

Figure 7:
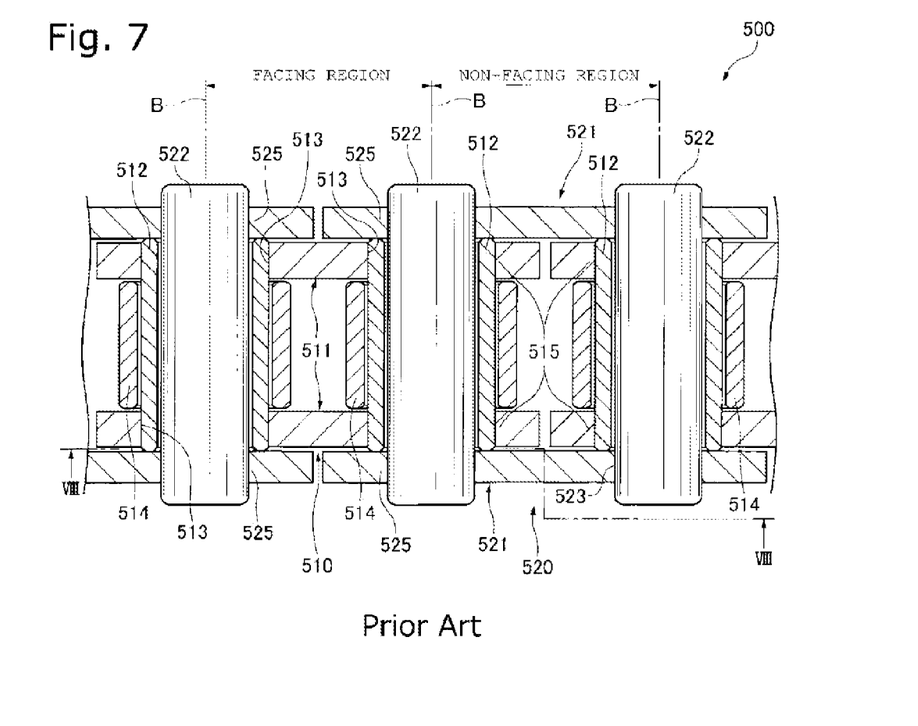
FIG. 7 is a cross-sectional view of a conventional technique corresponding to FIG. 3.
Figure 8:
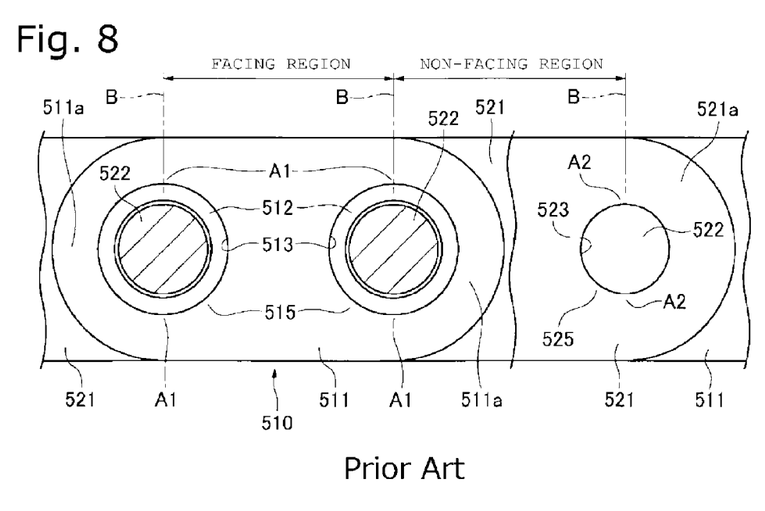
FIG. 8 is a partial cross-sectional view along the line VIII-VIII of FIG. 7.

Referring to FIG. 7 and FIG. 8, the conventional chain 500 has inner links 510 and outer links 520. The inner link 510 is formed by a pair of inner link plates 511, and a pair of bushings 512 rotatably supporting rollers 514 and press-fitted into a pair of bushing holes 513 in each inner link plate 511. The outer link 520 is formed by a pair of outer link plates 521 and a pair of connecting pins 522 loosely fitted in the bushings 512 and press-fitted into a pair of pin holes 523 in each outer link plate 521.

As the chain 500 moves, a tensile force is applied in each inner link 510 to the inner link plates 511 by the pair of bushings 512 pressing arcuate portions 511a of the inner link plates 511 in non-facing regions in directions of the tensile force. In each outer link 520, similarly, the tensile force is applied to the outer link plates 521, by the pair of connecting pins 522 pressing arcuate portions 521a of the outer link plates 521 in facing regions in directions of the tensile force.

In such a configuration where the bushings 512 apply the tensile force to the inner link plates 511 in the non-facing regions and the connecting pins 522 apply the tensile force to the outer link plates 521 in the facing regions, when the respective link plates 511 and 521 are subjected to the tension, the tensile stress is concentrated (hereinafter, "concentrated tensile stress") at boundary portions A1 and A2 including boundaries B between facing regions and non-facing regions in hole peripheral portions 515 around the bushing holes 513 of the inner link plates 511 and in hole peripheral portions 525 around the pin holes 523 of the outer link plates 521.

The facing region is an area in the inner link 510 formed along the longitudinal direction of the chain by facing portions of the pair of bushings 512 facing each other in the longitudinal direction of the chain. The non-facing region is an area located between the facing regions of inner links 510 adjacent each other in the longitudinal direction of the chain. The boundary portions A1 and A2 are portions suffering the concentrated tensile stress around the boundaries B between the facing regions and non-facing regions in the respective hole peripheral portions 515 and 525.

The tensile stress concentrated at the boundary portions A1 and A2 is partly caused by bending deformation of the arcuate portions 511a and 521a as the bushings 512 and the connecting pins 522 press the inner link plates 511 and the outer link plates 521, respectively.

The smaller the cross-sectional area of the respective link plates 511 and 521 at the boundaries, the larger the concentrated tensile stress. In the case with the illustrated chain 500, the cross-sectional area of the inner link plate 511 is minimum at the boundaries B in the facing regions, and the cross-sectional area of the outer link plate 521 is minimum in the non-facing regions.

During the long term use of the chain 500, cracks may be formed in the boundary portions A1 and A2 as they are repeatedly subjected to the concentrated tensile stress caused by fluctuations in chain tension, and there is a possibility of fatigue failure due to rupture of the inner link plates 511 or outer link plates 521. An attempt to improve the fatigue strength to prevent such fatigue failure by increasing the rigidity of the respective link plates 511 and 521 would lead to another problem of unwanted increases in size and weight of the link plates 511 and 521.

The concentration of tensile stress occurs also in a chain that uses inner links formed in one piece including a pair of inner link plates and a pair of bushings as shown in Japanese Examined Utility Model Application Publication No. H2-10848, at joint parts between the inner link plates and the bushings, which are portions corresponding to the boundary portions A1 of the chain 500.

SUMMARY OF THE INVENTION

The present invention is directed to solve the problems described above, its object being to provide a chain with improved durability due to higher strength of inner links, and to reduce its cost through simplification of assembly and reduction in the number of components, these being achieved by forming inner links as an integral link unit, each having a pair of connecting pin portions and a pair of plate portions coupling the pair of connecting pin portions.

Another object of the present invention is to provide a chain with enhanced power transmission capability and reduced weight.

According to an exemplary aspect of the present invention, there is provided a chain, formed by a plurality of inner links and outer links alternately and pivotally coupled together in a longitudinal direction of the chain, and placed over a sprocket, the inner links each being formed as a link unit having a pair of connecting pin portions spaced apart in the longitudinal direction of the chain and a pair of plate portions coupling the pair of connecting pin portions and spaced apart in a width direction of the chain, the pair of connecting pin portions and the pair of plate portions being inseparably joined at pairs of joint parts, the outer link being formed by a pair of link plates, and the pair of link plates sandwiching the pair of plate portions in the width direction of the chain and being pivotally coupled to the connecting pin portions to be spaced apart in the width direction of the chain.

The pair of connecting pin portions may have a pair of facing portions facing each other in the longitudinal direction of the chain and a pair of non-facing portions opposite the pair of facing portions in the longitudinal direction of the chain, the connecting pin portions may apply a tensile force to the plate portions via the pairs of joint parts each located in the pair of facing portions, and first meshing spaces surrounded by the pairs of connecting pin portions and the pairs of plate portions of the link units, and second meshing spaces surrounded by the connecting pin portions of the link units adjacent each other in the longitudinal direction of the chain and the pairs of link plates, may be alternately formed in the longitudinal direction of the chain, such as to allow a plurality of sprocket teeth of the sprocket to enter each of the first meshing spaces and the second meshing spaces one after another.

The pair of connecting pin portions may have a pair of facing portions facing each other in the longitudinal direction of the chain, and the plate portions may be located only between the pair of facing portions in the longitudinal direction of the chain.

The joint parts may have a joint height in a height direction of the chain equal to or less than a height of the connecting pin portions in the height direction of the chain.

Each of the connecting pin portions or the plate portions may have a sliding portion making sliding contact with a chain guide.

The chain may have rollers rotatably supported on the connecting pin portions to mesh with a plurality of sprocket teeth of the sprocket.

According to the first aspect of the present invention, the chain is formed by coupling together a plurality of inner links and outer links alternately and pivotally in a longitudinal direction of the chain and placed over a sprocket. The chain of pivotally coupled links transmits power to and from the sprocket as it passes over the sprocket, and it provides the following effects that are characteristic of the present invention.

According to the first aspect of the present invention, the inner links are each formed as a link unit having a pair of connecting pin portions spaced apart in a longitudinal direction of the chain and a pair of plate portions coupling the pair of connecting pin portions and spaced apart in a width direction of the chain, the pair of connecting pin portions and the pair of plate portions being inseparably joined at pairs of joint parts, and the outer links are each formed by a pair of link plates, so that the inner links have higher strength as they are formed as a simple structured link unit, whereby the durability of the chain is improved.

To assemble the chain, it is only necessary to couple a pair of link plates pivotally to a link unit, which is a single component having a pair of connecting pin portions and a pair of plate portions integrally formed, so that, as compared to conventional chains formed by press-fitting a pair of connecting pins to a pair of outer link plates, the chain can be assembled more easily, and the improved ease of assembly enables cost reduction.

Since the link plates are coupled to the connecting pin portions that are integral with the plate portions, the link unit and a pair of link plates are coupled together with a fewer number of components as compared to conventional chains that require connecting pins and bushings, which also contributes to cost reduction.

According to the second aspect of the present invention, the pair of connecting pin portions have a pair of facing portions facing each other in the longitudinal direction of the chain and a pair of non-facing portions opposite from the pair of facing portions in the longitudinal direction of the chain, and the connecting pin portions apply a tensile force to the plate portions via the pairs of joint parts each located in the pair of facing portions. As the connecting pin portions apply the tensile force to the plate portions via the joint parts within a facing region, which is an area between the pair of facing portions in the longitudinal direction of the chain, the tensile stress generated in part of the plate portions surrounding the connecting pin portions is dispersed over the joint parts, which prevents stress concentration at a boundary portion around the boundary between the facing region and a non-facing region that is an area between the pair of non-facing portions. The plate portions of the link unit can thus have improved fatigue strength, whereby the durability of the link unit, i.e., the durability of the chain, is improved.

First meshing spaces surrounded by the pairs of connecting pin portions and the pairs of plate portions of the link units, and second meshing spaces surrounded by the connecting pin portions of the link units adjacent each other in the longitudinal direction of the chain and the pairs of link plates, are alternately formed in the longitudinal direction of the chain. A plurality of sprocket teeth of the sprocket can enter each of the first meshing spaces and the second meshing spaces one after another. With the chain meshing with the sprocket, as the sprocket rotates, the sprocket teeth enter the first and second meshing spaces. Power transmission between the chain and the sprocket teeth occurs through the link units of the chain, where the connecting pin portions and the plate portions are inseparably joined so that there is no gap between the connecting pin portions and plate portions and any consequent relative displacement therebetween. Thus, noise resulting from such relative displacement is prevented, so that the chain can exhibit improved low noise performance.

According to the third aspect of the present invention, the plate portions are located only between the pair of facing portions in the longitudinal direction of the chain. Since the plate portions do not exist in the non-facing region, which is outside the pair of facing portions in the longitudinal direction of the chain, in the event that connecting pin portions suffer warping due to the tensile force, the plate portions will not contact the sprocket teeth, which would occur if the plate portions existed also in the non-facing region. Thus, noise, wear, and friction resistance caused by such contact are reduced, so that the chain can exhibit improved low noise performance, and better durability and power transmission capability.

As the plate portions do not exist in the non-facing region, the size of the plate portions in the longitudinal direction of the chain is accordingly smaller, so that the weight of the plate portions, i.e., the weight of the chain, can be reduced, which also contributes to reduction of noise.

According to the fourth aspect of the present invention, the joint height of the joint parts in the height direction of the chain is smaller than the pin height of the connecting pin portions, so that the tensile stress at the joint parts is limited to below a tolerable level, and at the same time, the reduced joint height allows the plate portions to have a smaller width in the height direction of the chain, whereby the weight of the plate portions, i.e., the weight of the chain, can be reduced. Also, as the connecting pin portions can be made as large or larger than the joint height, warping of the connecting pin portions due to the tensile force is prevented and the power transmission capability of the chain is improved.

According to the fifth aspect of the present invention, one of the connecting pin portions or the plate portions has a sliding portion that makes sliding contact with a chain guide. Thus, it is only necessary to form a sliding portion to either one of the connecting pin portions and the plate portions to slide against the chain guide depending on the pin height of the connecting pin portions or the plate height of the plate portions. This allows a larger freedom of design of the connecting pin portions and the plate portions of the link unit, for a chain designed to be guided by a guide in sliding contact with the link units.

According to the sixth aspect of the present invention, rollers are rotatably supported on the connecting pin portions to mesh with the sprocket teeth, so that the link units having the rollers can be handled as a single component. The ease of assembly of the chain, if provided with rollers, can thereby be improved.

DESCRIPTION OF THE PREFERRED EMBODIMENTS

The chain according to the present invention may be embodied in any specific form as long as it is formed by a plurality of inner links and outer links alternately and pivotally coupled together in a longitudinal direction of the chain and placed over a sprocket, the inner links each being formed as a link unit having a pair of connecting pin portions spaced apart in the longitudinal direction of the chain and a pair of plate portions coupling the pair of connecting pin portions and spaced apart in a width direction of the chain, the pair of connecting pin portions and the pair of plate portions being inseparably joined at pairs of joint parts, the outer link being formed by a pair of link plates, and the pair of link plates sandwiching the pair of plate portions in the width direction of the chain and being pivotally coupled to the connecting pin portions such as to be spaced apart in the width direction of the chain, so that the durability is improved through the increase in strength of the inner links, and cost is reduced through simplification of assembly and reduction in the number of components.

For example, in the link unit of the chain of the present invention, the joining means for joining the connecting pin portions and the plate portions may be any of single piece forming, fusing (or welding), and bonding.

The link unit of the chain of the present invention may be made of any of synthetic resin (hereinafter, "resin"), metal, or a combination of resin and metal (such as a resin product with an insertion-molded metal piece). If the link unit is to be made of resin, it may be formed from two different resins for the connecting pin portions and the plate portions so that they have two different colors. The resin may be fiber-reinforced resin reinforced with fibers. If the link unit is to be made of metal, the single piece forming process may be any of casting, plastic forming (such as forging), and machining.

The link unit of the chain of the present invention may at least include a pair of plate portions spaced apart in the width direction, and may include three or more plate portions. The link unit may include one or more plate portions in addition to the pair of plate portions, for example, in order to reduce the tensile stress at the joint parts. Alternatively, the link unit may include two pairs of plate portions spaced apart in the width direction of the chain so that the chain can pass over a sprocket having two rows of sprocket teeth arranged in the width direction of the chain.

The chain of the present invention may be used as a transmission chain or a conveyor chain in any machine such as conveyor machines, industrial machines, and vehicles.

Embodiments

Hereinafter, embodiments of the present invention will be described with reference to FIG. 1 to FIG. 6.

Figure 1:
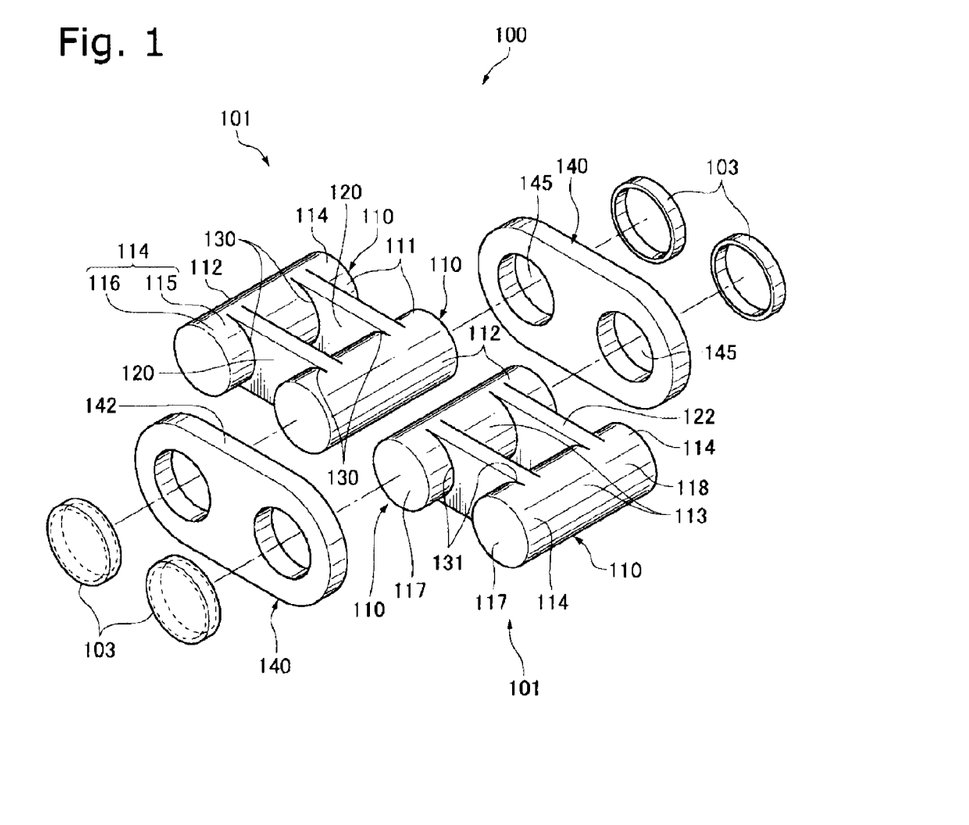
FIG. 1 is an exploded perspective view of part of a chain, illustrating one example of embodiment of the present invention.
Figure 2:
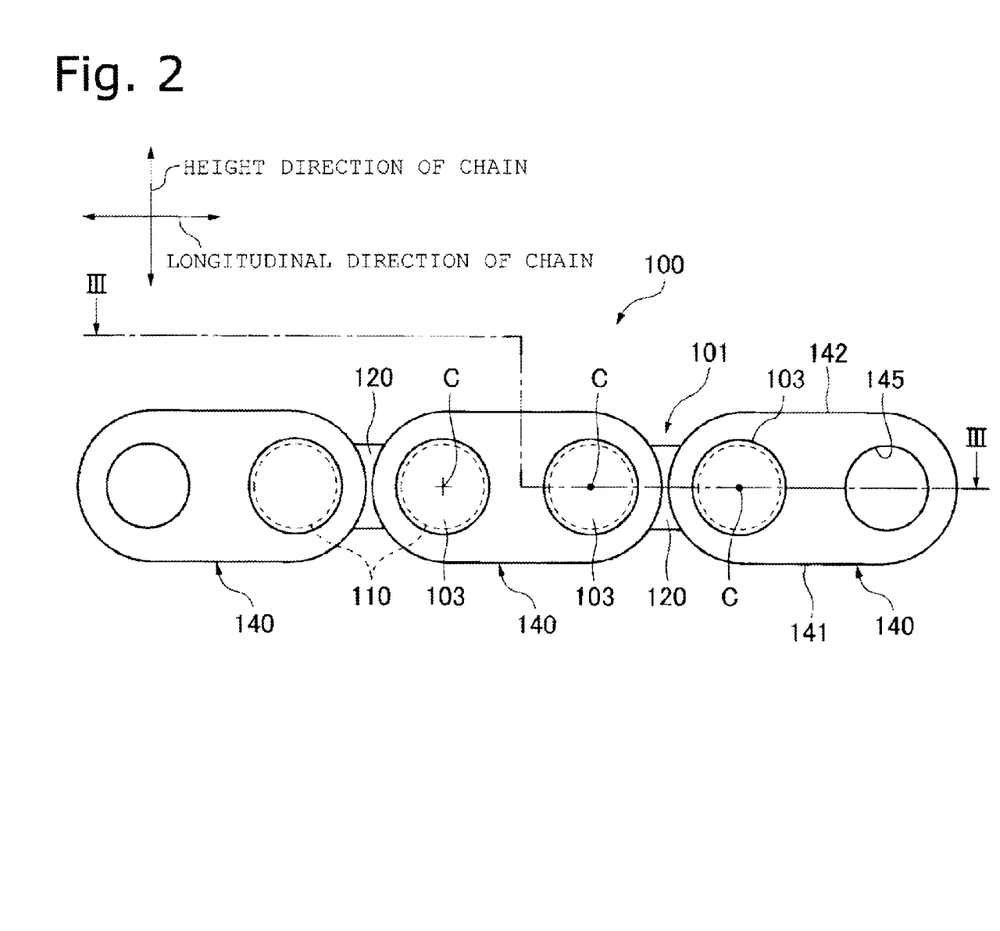
FIG. 2 is a front view of an essential part of the chain of FIG. 1.
Figure 3:
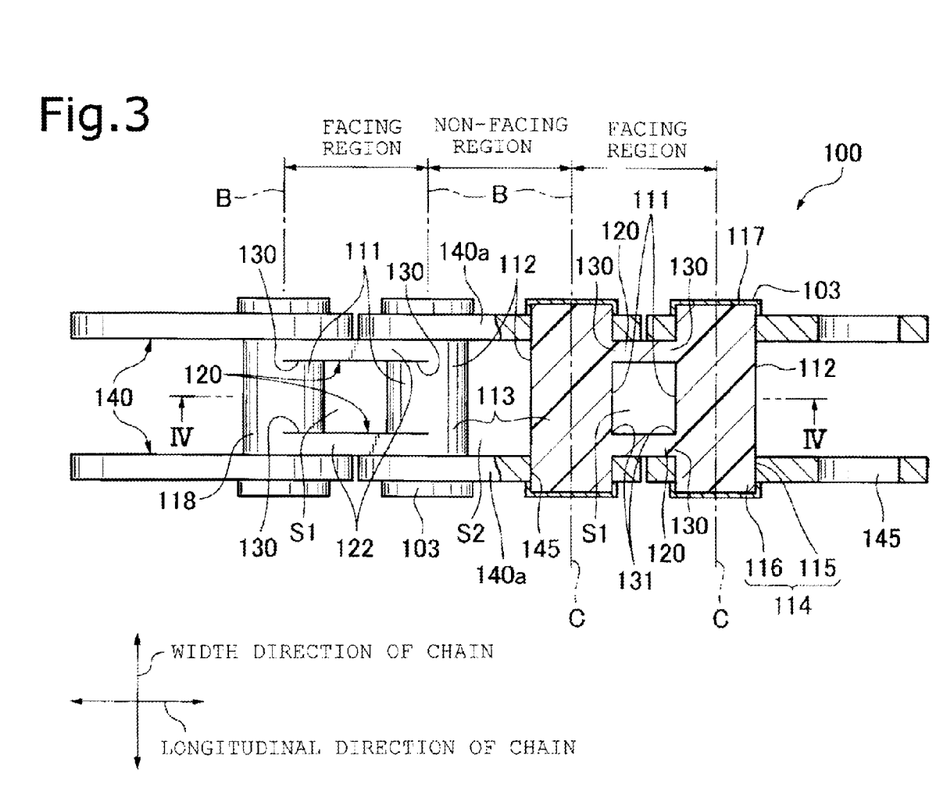
FIG. 3 is a partial cross-sectional view along the line III-III of FIG. 2.

Referring to FIG. 1 to FIG. 3, in one embodiment of the present invention, the chain 100 is an endless chain made up of a plurality of link units 101 that form inner links, a plurality of pairs of link plates 140 that form outer links. Each link unit 101 is coupled to each pair of link plates 140 by connecting pin portions 110 of the link unit 101 so that all the link units 101 and all the pairs of link plates 140 are connected alternately in a longitudinal direction of the chain (hereinafter, "longitudinal direction") such as to be pivotable around the connecting pin portions 110.

Figure 5:
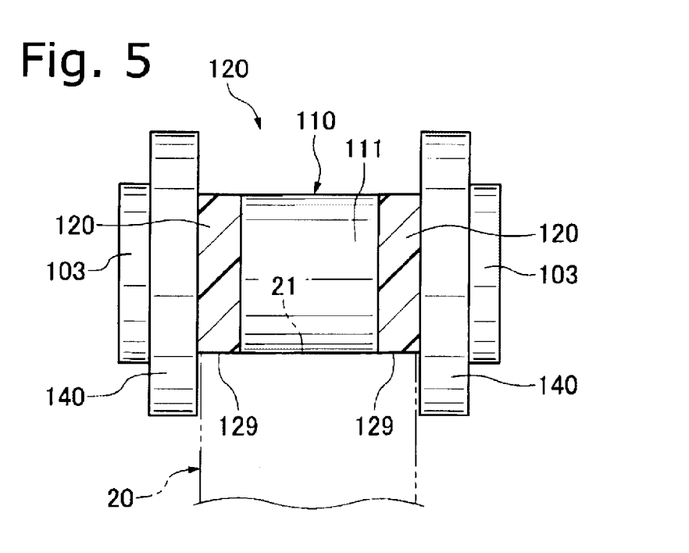
FIG. 5 is a cross-sectional view along the line V-V of FIG. 4.
Figure 6:
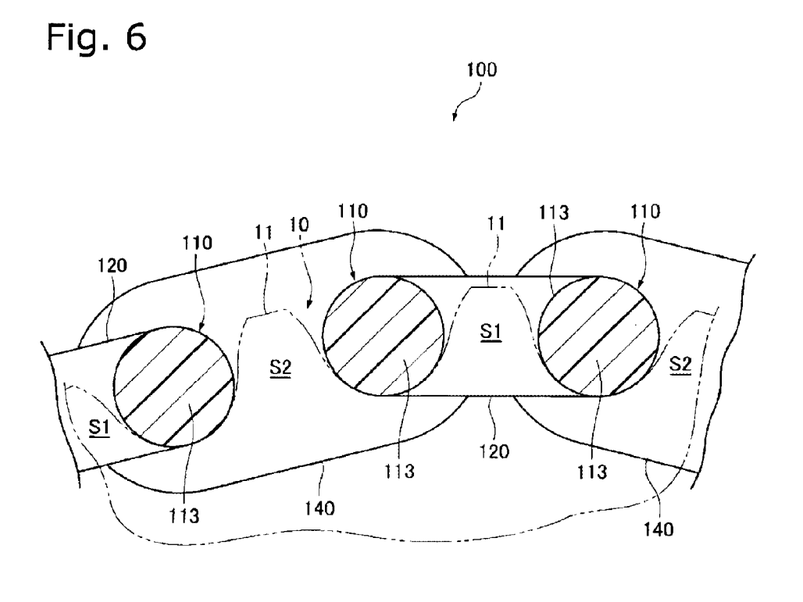
FIG. 6 is a cross-sectional view showing the same part as FIG. 4 of the chain of FIG. 1 passing over a sprocket.

The chain 100 is used as a transmission chain and forms a chain transmission device, with a sprocket mechanism having a plurality of sprockets 10 (one of which is shown in FIG. 6) for the chain 100 to pass over, and a chain guide 20 (see FIG. 4 and FIG. 5) for guiding the chain 100 that runs in the longitudinal direction.

The chain 100 moves when driven by a drive sprocket, which is one of the plurality of sprockets 10. The chain guide 20 has a guide surface 21 (see FIG. 4 and FIG. 5) in sliding contact with the running chain 100, and this guide surface 21 prevents the chain 100 from moving in the height direction of the chain (hereinafter, "height direction") and in the width direction of the chain (hereinafter, "width direction").

The height direction is a direction orthogonal to the longitudinal direction and the width direction of the chain 100 laid out straight. In this embodiment, it is a direction orthogonal to a plane containing a pair of pivot center lines C that are adjacent each other in the longitudinal direction, as will be described later, of the link unit 101.

The link unit 101 is a single component made up of a pair of connecting pin portions 110 spaced apart in the longitudinal direction (hereinafter, "pin portion 110"), and a pair of plate portions 120 each coupling together the pair of pin portions 110 and spaced apart in the width direction.

The pair of pin portions 110 and the respective plate portions 120 are inseparably joined together at pairs of joint parts 130 by single piece forming as joining means, thereby forming the link unit 101. Each plate portion 120 couples together each pair of pin portions 110 only at the pair of joint parts 130.

"Inseparably joined" here means that, under the tensile force applied to the moving chain 100, the pair of pin portions 110 do not separate from the respective plate portions 120 at the joint parts 130, so that the tension applied to the pin portions 110 and the plate portion 120 is conveyed between both portions 110 and 120 via the joint parts 130.

In other words, the pair of pin portions 110 and the pair of plate portions 120 of the link unit 101 are made of a single type of resin that is the constituent material. The pair of pin portions 110 have the same shape, and the pair of plate portions 120 have the same shape.

"Plate" herein referred to is a component having a smaller minimum thickness in the width direction than a maximum length in the longitudinal direction.

The joint part 130 is a region surrounded by joint boundaries 131 between pin portions 110 and plate portions 120 of the link unit 101 that are inseparably joined in a frame-like manner. As the link unit 101 is formed by single piece forming in this embodiment, the entire region including the joint boundaries 131 is the joint part 130. In an alternative embodiment, only part of the region may be the joint part 130.

Each pin portion 110 includes a meshing portion 113 (see FIG. 4 and FIG. 6, too) that is an inside part in the width direction relative to the pair of plate portions 120 and that is a transmitting part for transmitting power to and from the sprocket 10, and a pair of protruding portions 114 protruding from the pair of plate portions 120 to the opposite sides in relation to the meshing portion 113 in the width direction.

"Inside in the width direction" here means a part of the pin portion 110 between the pair of plate portions 120 in the width direction. "Outside in the width direction" refers to an opposite side from the "inside in the width direction" of the pin portion 110 in relation to each plate portion 120 in the width direction.

The meshing portion 113 can mesh with a plurality of sprocket teeth 11 (see FIG. 6) of the sprocket 10 to directly transmit power to and from the sprocket teeth 11.

Each protruding portion 114 includes a support portion 115 closer to the plate portion 120 in the width direction and a pin end 116 having a pin end face 117. The support portion 115 supports the link plate 140 such as to allow it to pivot therearound or the pivot center line C.

The pivot center line C is a center line around which the link unit 101 and the pair of link plates 140 turn or pivot relative to each other as the chain 100 engages with or disengages from the sprocket 10. This pivot center line C is defined by each pin portion 110. In this embodiment, it is the center axial line of the pin portion 110 that extends parallel to the width direction.

"Radial direction" and "circumferential direction" refer to the radial and circumferential directions around the pin portion 110 or the pivot center line C, respectively.

Figure 4:
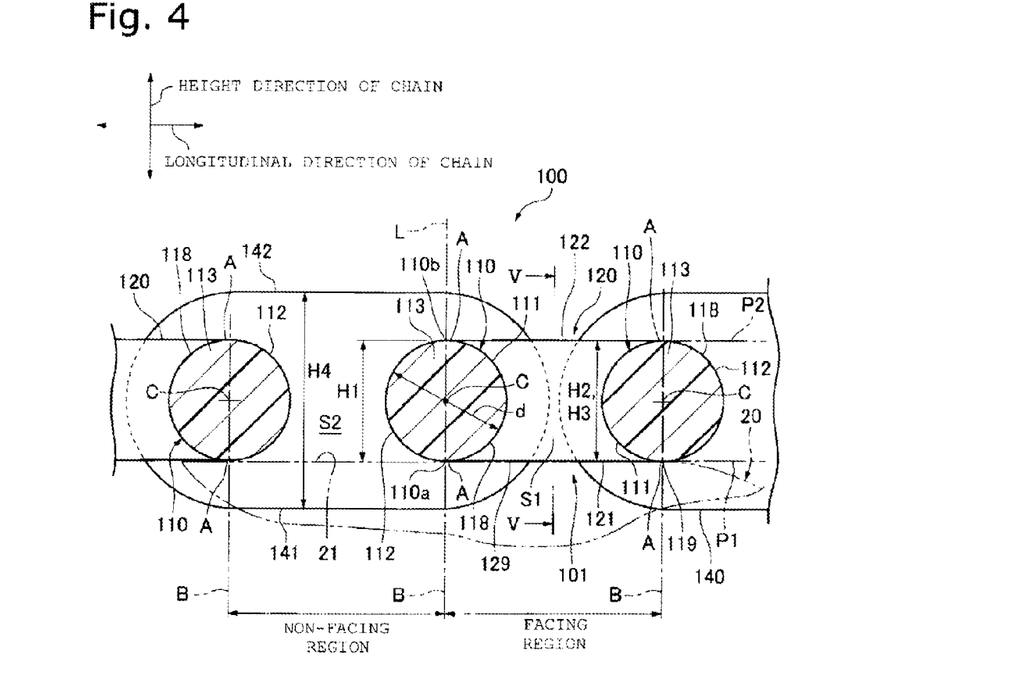
FIG. 4 is a cross-sectional view of an essential part along the line IV-IV of FIG. 3.

Referring also to FIG. 4, the meshing portion 113 and the protruding portions 114 of the pin portion 110 have a substantially circular and uniform cross-sectional shape at any given position in the width direction. A cross section here refers to a cross-sectional plane perpendicular to the width direction or the pivot center line C.

The meshing portion 113 and the protruding portions 114 of the pin portion 110 have an outer circumferential surface 118 that substantially forms a rotating surface and is substantially columnar. Thus the pin portion 110 is a solid columnar member having a columnar outer circumferential surface 118.

Terms or expressions with the modifier "substantially" herein should be understood to include not only those without such modifier, but also those that may not be strictly identical to the terms and expressions without such modifier but have no significant difference in effects from the terms and expressions without the modifier.

Referring to FIG. 1, FIG. 3, and FIG. 4, the pair of pin portions 110 of the link unit 101 have a pair of facing portions 111 facing each other in the longitudinal direction, and a pair of non-facing portions 112 on the opposite sides from the facing portions 111 in the longitudinal direction.

The facing portion 111 and the non-facing portion 112 are two sections of the pin portion 110 divided by a line L in a cross-sectional plane thereof at a given position in the width direction, the line L passing through a lowest point 110a and a highest point 110b that are two points on the outer circumferential surface 118 defining the pin height H1 of the pin portion 110 (i.e., the maximum width of the outer circumferential surface 118 in the height direction). In this embodiment, the lowest point 110a and the highest point 110b are intersections between the line L crossing the pivot center line C and parallel to the height direction and the outer circumferential surface 118.

The pair of facing portions 111 of the pair of pin portions 110 define a region therebetween in the longitudinal direction, i.e., a facing region that is an area having the pair of facing portions 111 as its boundaries in the longitudinal direction. This facing region is herein referred to as a first pitch region of the link unit 101.

The first pitch region is a region in the longitudinal direction defined by the center axial lines (i.e., pivot center lines C) of the pair of pin portions 110, which defines the first pitch of the link unit 101.

The pair of non-facing portions 112 of the pin portions 110 of link units 101 adjacent each other in the longitudinal direction define a region therebetween in the longitudinal direction, i.e., a non-facing region that is an area having the pair of non-facing portions 112 as its boundaries in the longitudinal direction. The non-facing region is adjacent the facing region in the longitudinal direction. It is an outer region relative to the facing region, and also a second pitch region of the pair of link plates.

The second pitch region is a region along the longitudinal direction defined by the center axial lines of the closest pair of pin portions 110 of the link units 101 adjacent each other in the longitudinal direction, which defines the second pitch of the pair of link plates 140.

The pair of pin portions 110 and the planar plate portions 120 are inseparably joined together only in the facing portion 111 of each pin portion 110 and not in the non-facing portion 112.

Therefore, the joint part 130 exists (or is located) only in the facing portion 111 of each pin portion 110, over a range of thickness of the plate portion 120 in the width direction, and at least partially along the circumference of the facing portion 111, or over the entire circumference of the facing portion 111 as in the present embodiment, while it does not exist (is not located) in the non-facing portion 112. Therefore, the pair of plate portions 120 are provided only between the pair of facing portions 111 in the longitudinal direction (i.e., inside the facing region) of the link unit 101. The non-facing portions 112 are continuous with the plate portions 120 and do not have any part protruding in the longitudinal direction or radially outward from the outer circumferential surface 118.

In this way, the plate portions 120 are located entirely inside the facing region in the longitudinal direction, extending in the longitudinal direction a length equal to that of the region.

Referring primarily to FIG. 4, and also to FIG. 1 as required, the pin height H1 equals to the outer diameter d of the pin portion 110, as well as to the plate height H2 of the plate portion 120 in this embodiment. The plate height H2 is the distance between first and second plate end faces 121 and 122 of the plate portion 120 in the height direction at a given position in the longitudinal direction between the pair of facing portions 111 in the longitudinal direction (i.e., in the facing region). The plate height H2 is set so that the plate portion 120 has required tensile rigidity to withstand the tensile force applied thereto.

In this embodiment, the plate height H2 is the same at any given position in the longitudinal direction. In other words, the maximum and minimum values of the plate height H2 are the same.

The outer diameter d of the pin and the plate height H2 are both larger than ½ of the plate height H4 of the link plate 140.

The joint height H3 of the joint part 130 in the height direction of the chain and the pin height H1 (or outer diameter d) of the pin portion 110 are both larger than the minimum value of the plate height H2 of the plate portion 120 and smaller than the maximum value, or equal to the plate height H2, as in this embodiment.

The joint height H3, which determines the range of the joint part 130 in the height direction, is set smaller than the maximum value of the pin height H1. In this embodiment, the pin height H1 is the same at any given position in the width direction, or, as differently put, the maximum and minimum values of the pin height H1 are the same, and the joint height H3 equals to the pin height H1, or the maximum value of the pin height H1 (i.e., outer diameter d).

Both plate end faces 121 and 122, which are the end faces of the plate portions 120 in the height direction, are flat surfaces respectively positioned on a pair of first and second tangent planes P1 and P2 common to the outer circumferential surface 118 of both pin portions 110 over the entire length in the longitudinal direction and substantially entirely. The plate portions 120 thus do not protrude from the pin portions 110 in both height directions, and as the plate portions 120 are smaller in the height direction, their weight is accordingly reduced.

Referring to FIG. 4 and FIG. 5, each pin portion 110 and each plate portion 120 of the link unit 101 have a pin sliding portion 119 and a plate sliding portion 129, respectively, which make sliding contact with the chain guide 20. Depending on the shape of the guide surface 21 and the running condition of the chain 100, at least one of both pin sliding portions 119 and both plate sliding portions 129 make contact with the guide surface 21 at the same time, or only both plate sliding portions 129 make contact with the guide surface 21 at the same time.

Referring to FIG. 1 to FIG. 5, the pair of planar link plates 140 of the same shape are spaced apart in the width direction and coupled to each pin portion 110 in a pivotable manner. In this embodiment, the pair of link plates 140 are arranged on both sides of the plate portions 120 in the width direction, which is to say, the pair of plate portions 120 are located in between the pair of link plates 140 in the width direction.

The link plates 140 made of a metal material are formed with a pair of pin holes 145 that are spaced apart in the longitudinal direction. The protruding portions 114 are inserted into the pin holes 145 as far as to the support portions 115 so that the link plates 140 are pivotally coupled to the pin portions 110 with a loose fit (clearance fit) on the support portions 115.

The plate height H4 of the link plates 140 is larger than the plate height H2 of the plate portions 120 so that the link plates 140 protrude in both height directions more than the plate portions 120.

The plate height H4 is the distance between first and second plate end faces 141 and 142 of the link plate 140 in the height direction at a given position in the longitudinal direction between a pair of non-facing portions 112 adjacent each other in the longitudinal direction (or "non-facing region" as will be described later). The plate height H4 is the same at any given position in the longitudinal direction.

Referring to FIG. 3, FIG. 4, and FIG. 6, in each link unit 101 is formed a first meshing space S1 that is surrounded only by the facing portions 111 of the pair of pin portions 110 and the pair of plate portions 120 to allow a sprocket tooth 11 to come in and to go out (enter and exit). Also formed is a second meshing space S2 that is surrounded only by the non-facing portions 112 of the pair of pin portions 110 of link units 101 adjacent each other in the longitudinal direction and the pair of link plates 140 to allow a sprocket tooth 11 to come in and to go out.

As the sprocket 10 rotates, when the chain 100 meshes with the sprocket 10, each of the sprocket teeth 11 enters into each of the first and second meshing spaces S1 and S2 of the chain 100 that are alternately arranged in the longitudinal direction one by one. As the chain 100 disengages from the sprocket 10, the sprocket teeth 11 exit the meshing spaces one by one.

Referring to FIG. 1 to FIG. 3 and FIG. 5, the chain 100 includes a plurality of caps 103 abutting on the link plates 140 as retainers to stop the link plates 140 from coming off of the pin portions 110.

A pair of caps 103 are provided to each pin portion 110. The caps are given to each of the pair of pin ends 116 for the pair of link plates 140 supported on both support portions 115. The caps 103 are fixedly attached to the pin ends 116 such as to cover the pin end faces 117 by press fitting as one means of secure attachment.

To assemble the chain 100, first, both protruding portions 114 of the pin portions 110 of the link unit 101 are inserted into the pin holes 145, so that the pair of link plates 140 are loosely fitted on the support portions 115. The caps 103 are then attached to the respective pin ends 116 to retain the link plates 140.

Through the same assembling steps, the chain 100 is formed by link units 101 and pairs of link plates 140 coupled together alternately in the longitudinal direction.

Referring to FIG. 3, when the chain 100 is subjected to tension, the pin portions 110 transmit the tensile force to the plate portions 120 in the facing region only through the respective joint parts 130. The joint parts 130 are subjected to tensile stress. This tensile stress is reduced by making the pin height H1 or outer diameter d larger.

The pin portions 110 press the link plates 140 in the directions of the tensile force in the facing region to apply the tensile force to the link plates 140.

Next, the effects of the embodiment configured as described above will be explained.

The chain 100 is formed by alternately and pivotally coupling together link units 101 and pairs of link plates 140 in the longitudinal direction of the chain, and placed over a plurality of sprockets 10 that form a sprocket mechanism. Thus, the chain 100, which is formed by alternately and pivotally coupling together link units 101 and pairs of link plates 140 in the longitudinal direction of the chain, as it passes over the plurality of sprockets 10, can transmit power to and from the sprockets 10.

The link unit 101 is formed by a pair of pin portions 110 and a pair of plate portions 120. Each plate portion 120 is coupled to the pair of pin portions 110 at a pair of joint parts 130 where the pair of pin portions 110 and the plate portions 120 are inseparably joined together. The pin portions 110 apply the tensile force to the plate portions 120 via the joint parts 130 that are located in the facing portions 111. The pair of link plates 140 are pivotally coupled to the pin portions 110 such as to sandwich the pair of plate portions 120 in the width direction.

As the pin portions 110 apply at the facing region the tensile force to the plate portions 120 via the joint parts 130, the tensile stress generated in part of the plate portions 120 surrounding the pin portions 110 is dispersed over the joint parts 130, which prevents stress concentration at boundary portions A (see FIG. 4) around the boundaries B (see FIG. 4) between the facing regions and the non-facing regions. The plate portions 120 of the link unit 101 can thus have improved fatigue strength, whereby the durability of the link unit 101, i.e., the durability of the chain 100, is improved.

To assemble the chain 100, it is only necessary to couple a pair of link plates 140 pivotally to a link unit 101, which is a single component having a pair of connecting pin portions 110 and a pair of plate portions 120 integrally formed, so that, as compared to conventional chains formed by press-fitting a pair of connecting pins to a pair of outer link plates, the chain 100 can be assembled more easily, and the improved ease of assembly enables cost reduction.

Since the link plates 140 are coupled to the pin portions 110 that are integral with the plate portions 120, the link unit 101 and a pair of link plates 140 are coupled together with a fewer number of components as compared to conventional chains that require connecting pins and bushings, which also contributes to cost reduction.

First meshing spaces S1 surrounded by the pairs of pin portions 110 and pairs of plate portions 120 of the link units 101, and second meshing spaces S2 surrounded by the pin portions 110 of link units 101 adjacent each other in the longitudinal direction and pairs of link plates 140, are alternately formed in the longitudinal direction. Each of the sprocket teeth 11 of the sprocket 10 can enter each of the first and second spaces S1 and S2 one after another.

With the chain 100 passing over the sprocket 10, as the sprocket 10 rotates, the sprocket teeth 11 enter the first and second meshing spaces S1 and S2.

When power transmission between the chain 100 and the sprocket 10 is implemented, power transmission between the chain 100 and the sprocket teeth 11 occurs through the link units 101 of the chain 100, where pin portions 110 and plate portions 120 are inseparably joined so that there is no gap between the pin portions 110 and plate portions 120 and any consequent relative displacement therebetween. Thus, noise resulting from such relative displacement is prevented, so that the chain 100 can exhibit improved low noise performance.

The plate portions 120 are located only between a pair of facing portions 111 in the longitudinal direction, so that the joint parts 130 are located in the pair of facing portions 111 of the pin portion 110. Since the plate portions 120 do not exist in the non-facing region, or the second meshing space S2, which is outside the pair of facing portions 111 in the longitudinal direction, in the event that pin portions 110 suffer warping due to the tensile force, the plate portions 120 will not contact the sprocket teeth 11, which would occur if the plate portions 120 existed also in the non-facing region. Thus, noise, wear, and friction resistance caused by such contact are reduced, so that the chain 100 can exhibit improved low noise performance, and better durability and power transmission capability.

As the plate portions 120 do not exist in the non-facing region, the size of the plate portions 120 in the longitudinal direction of the chain is accordingly smaller, so that the weight of the plate portions 120, i.e., the weight of the chain 100, can be reduced, which also contributes to reduction of noise.

By setting the joint height H3 of the joint parts 130 smaller than the pin height H1 of the pin portions 110, the tensile stress at the joint parts 130 is limited to below a tolerable level, and at the same time, the reduced joint height H3 allows the plate portions 120 to have a smaller width in the height direction, whereby the weight of the plate portions 120, i.e., the weight of the chain 100, can be reduced. Pin portions 110 can be made as large or larger than the joint height H3, to prevent warping of the pin portions 110 due to the tensile force and to improve the power transmission capability of the chain 100.

The joint height H3 is equal to the plate height H2, meaning that the joint parts 130 are made as large as to have the same height as the plate height H2 in the height direction, which is set to secure sufficient tensile rigidity of the plate portions 120 against the tensile force. As the joint part 130 has a wider area, the tensile stress at the joint parts 130 caused by the tensile force is reduced, so that the durability of the link unit 101 is improved.

The pin height H1 is equal to the plate height H2, meaning that the connecting pin portions 110 are made as large as to the plate height H2 of the plate portions 120, so that bending of the connecting pin portions 110 due to the tensile force is less likely to occur, which leads to improved power transmission capability of the chain 100. Also, as the joint parts 130 where the connecting pin portions 110 and the plate portions 120 are inseparably joined have a wider area, the tensile stress at the plate portions 120 is reduced, so that the durability of the link unit 101 is improved.

The pair of pin portions 110 and the pair of plate portions 120 each have pin sliding portions 119 and plate sliding portions 129 that slide against the guide surface 21 of the chain guide 20, respectively. In the link unit 101, therefore, the pair of pin portions 110 slide against the guide surface 21 in addition to the pair of plate portions 120, so that, as compared to a case where only the pair of plate portions 120 slide against the guide surface 21, the plate portions 120 make sliding contact with the guide surface 21 less frequently because of the pin portions 110 also sliding on the guide surface 21, or, the contact pressure on the guide surface 21 is reduced due to both of the plate portions 120 and pin portions 110 making sliding contact therewith. Thus, wear of the plate portions 120 is reduced, so that the durability of the plate portions 120, i.e., the durability of the chain 100, is improved.

Below, an alternative embodiment will be described, with respect to changes made to part of the structure of the previously described embodiment.

If the link unit is formed by connecting pin portions and plate portions that are separate components joined together by joining means such as fusing or bonding, rollers may be rotatably supported on the connecting pin portions to mesh with the sprocket teeth. Power transmission between the chain and the sprocket occurs in this case through the rollers, as meshing parts, between the connecting pin portions and the sprocket teeth as transmission parts. With rollers rotatably supported on the connecting pin portions to mesh with the sprocket teeth, link units having the rollers can be handled as a single component, so that the ease of assembly of a chain with rollers can be improved.

Columnar pin portions 110 may have portions with different outer diameters at positions in the width direction. For example, the outer diameter or the cross-sectional shape thereof may differ in the protruding portion 114 and in the meshing portion 113.

The plate height H2 may differ at two or more positions in the longitudinal direction, i.e., may have different minimum and maximum values.

In the link unit 101, only one of the pin portions 110 and the plate portions 120 may have the sliding portions, i.e., either the pin portions 110 only may have the pin sliding portions 119, or the plate portions 120 only may have the plate sliding portions 129. In this case, it is only necessary to make either one of the pin portions 110 and the plate portions 120 slide against the guide surface 21 of the chain guide 20 depending on the pin height H1 of the pin portions 110 or the plate height H2 of the plate portions 120. This allows a larger freedom of design of the pin portions 110 and plate portions 120 of the link unit 101 for a chain 100 designed to be guided by a guide in sliding contact with the link units 101.

Part of plate portions 120 other than at the joint parts 130 may extend beyond the facing region in the longitudinal direction.

Retainers may be formed by plastically deforming the pin ends 116 of the pin portions 110 instead of using the caps 103.

What is claimed is:

1. A chain, formed by a plurality of inner links and outer links alternately and pivotally coupled together in a longitudinal direction of the chain, and placed over a sprocket,
    the inner links each being formed as a link unit having a pair of connecting pin portions spaced apart in the longitudinal direction of the chain and a pair of plate portions coupling the pair of connecting pin portions and spaced apart in a width direction of the chain,
    the pair of connecting pin portions and the pair of plate portions being inseparably joined at pairs of joint parts,
    the outer link being formed by a pair of link plates, and
    the pair of link plates sandwiching the pair of plate portions in the width direction of the chain and being pivotally coupled to the connecting pin portions to be spaced apart in the width direction of the chain.

2. The chain according to claim 1, wherein
    the pair of connecting pin portions have a pair of facing portions facing each other in the longitudinal direction of the chain and a pair of non-facing portions opposite the pair of facing portions in the longitudinal direction of the chain,
    the connecting pin portions applying a tensile force to the plate portions via the pairs of joint parts each located in the pair of facing portions, and
    first meshing spaces surrounded by the pairs of connecting pin portions and the pairs of plate portions of the link units, and second meshing spaces surrounded by the connecting pin portions of the link units adjacent each other in the longitudinal direction of the chain and the pairs of link plates, are alternately formed in the longitudinal direction of the chain, such as to allow a plurality of sprocket teeth of the sprocket to enter each of the first meshing spaces and the second meshing spaces one after another.

3. The chain according to claim 1, wherein
    the pair of connecting pin portions have a pair of facing portions facing each other in the longitudinal direction of the chain, and
    the plate portions are located only between the pair of facing portions in the longitudinal direction of the chain.

4. The chain according to claim 1, wherein the joint parts have a joint height in a height direction of the chain equal to or less than a height of the connecting pin portions in the height direction of the chain.

5. The chain according to claim 1, wherein each of the connecting pin portions or the plate portions has a sliding portion making sliding contact with a chain guide.

6. The chain according to claim 1, further comprising rollers rotatably supported on the connecting pin portions to mesh with a plurality of sprocket teeth of the sprocket.

* * * * *